(12) United States Patent
Kharbanda et al.

(10) Patent No.: US 12,277,635 B1
(45) Date of Patent: Apr. 15, 2025

(54) USER VERIFICATION OF A GENERATIVE RESPONSE TO A MULTIMODAL QUERY

(71) Applicant: Google LLC, Mountain View, CA (US)

(72) Inventors: Harshit Kharbanda, Pleasanton, CA (US); Louis Wang, San Francisco, CA (US); Christopher James Kelley, Orinda, CA (US); Jessica Lee, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/532,470

(22) Filed: Dec. 7, 2023

(51) Int. Cl.
   *G06T 11/60* (2006.01)
   *G06T 13/80* (2011.01)
(52) U.S. Cl.
   CPC .............. *G06T 11/60* (2013.01); *G06T 13/80* (2013.01)
(58) Field of Classification Search
   None
   See application file for complete search history.

(56) References Cited

U.S. PATENT DOCUMENTS

| | | | |
|---|---|---|---|
| 10,691,747 B2 | 6/2020 | Bakir et al. | |
| 2014/0160157 A1* | 6/2014 | Poulos | G06F 3/011 345/633 |
| 2014/0240349 A1* | 8/2014 | Tuukkanen | G06F 3/0484 345/633 |
| 2017/0318407 A1* | 11/2017 | Meister | H04S 7/303 |
| 2017/0330023 A1* | 11/2017 | Gordon | G06V 20/64 |
| 2018/0189354 A1* | 7/2018 | Paine | G06F 3/017 |
| 2018/0210536 A1* | 7/2018 | Messely | G06F 1/3231 |
| 2018/0336009 A1* | 11/2018 | Yoganandan | G06F 3/0346 |
| 2018/0336414 A1* | 11/2018 | Badr | G06F 16/90332 |
| 2019/0095467 A1 | 3/2019 | Kislyuk et al. | |
| 2020/0057922 A1* | 2/2020 | Melivilu | G06V 30/142 |
| 2020/0066270 A1 | 2/2020 | Lee et al. | |
| 2020/0193976 A1* | 6/2020 | Cartwright | G06F 3/011 |
| 2020/0202849 A1* | 6/2020 | Cartwright | G10L 15/1815 |
| 2020/0250433 A1* | 8/2020 | Nowak-Przygodzki | G06F 16/9032 |
| 2021/0224312 A1 | 7/2021 | Harikumar et al. | |
| 2022/0207872 A1* | 6/2022 | Ren | G06N 3/044 |
| 2022/0237832 A1* | 7/2022 | Williams | G06V 10/44 |
| 2022/0283696 A1* | 9/2022 | Moon | G06N 3/105 |
| 2023/0237091 A1 | 7/2023 | Klein et al. | |
| 2024/0046515 A1* | 2/2024 | Adeel | G06V 10/82 |

OTHER PUBLICATIONS

International Search Report and Written Opinion for Application No. PCT/US2024/056420, mailed Feb. 20, 2025, 11 pages.

* cited by examiner

*Primary Examiner* — Jeffrey J Chow
(74) *Attorney, Agent, or Firm* — DORITY & MANNING P.A.

(57) ABSTRACT

A multimodal search system is described. The system can receive image data from a user device. Additionally, the system can receive a prompt associated with the image data. Moreover, the system can determine, using a computer vision model, a first object in the image data that is associated with the prompt. Furthermore, the system can receive, from the user device, a user indication on whether the image data includes the first object. Subsequently, in response to receiving the user indication, the system can generate a response using a large language model.

20 Claims, 9 Drawing Sheets

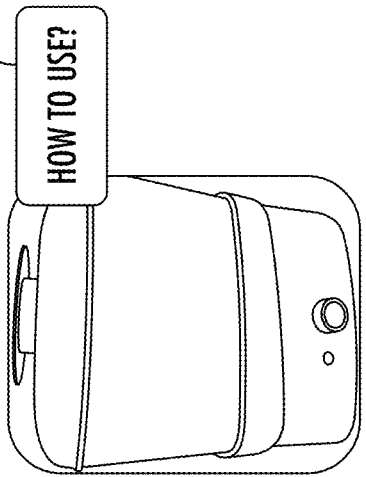

◆ GENERATIVE AI IS EXPERIMENTAL INFO QUALITY MAY VARY.

[-5.2292] THIS IS A THE PAPABILIO BABY BOTTLE ELECTRIC STEAM STERILIZER AND DRYER

TO USE THIS PRODUCE, FOLLOW THESE STEPS"
1. FULL THE WATER RESERVOIR WITH WATER
2. PLACE THE BOTTLE, NIPPLES, PACIFIER, AND ANY ACCESSORIES INTO THE STERILIZER BASKET
3. PLACE THE STERILIZER BASKET INTO THE STERILIZER
4. CLOSE THE LID AND PLUG IN THE STERILIZER
5. TURN THE KNOB TO THE DESIRED SETTING (STERILIZE OR DRY)
6. THE STERILIZER WILL TURN OFF AUTOMATICALLY WHEN THE CYCLE IS COMPLETE

GIVES DETAILED ANSWER TO THE USER'S QUESTION

FIG. 5

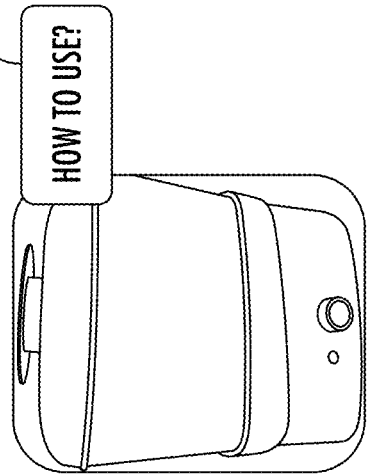

ANSWERS LACKING DETAIL

ANSWER NOT DETAILED ENOUGH

◆ GENERATIVE AI IS EXPERIMENTAL INFO QUALITY MAY VARY.

[17.6418] THE MANUAL FOR THE PAPABILIO BABY BOTTLE ELECTRIC STEAM STERILIZER AND DRYER CAN BE FOUND HERE: HTTPS://PAPABILIO.COM/WP-CONTENTUPLOAD2022/0/PAPABILIO-BABY-BOTTLE-ELECTRIC-STEAM-STERILIZER-AND-DRYER-MANUAL.PDF

USER VERIFICATION OF A GENERATIVE
RESPONSE TO A MULTIMODAL QUERY

FIELD

The present disclosure relates generally to using machine-learned techniques to provide generative responses for multimodal queries based on user verification of input data. More particularly, the present disclosure relates to processing user-verified image data with a prompt to generate a response.

BACKGROUND

In the field of artificial intelligence (AI), a hallucination can be a response generated by a large language model (LLM) that contains incorrect information. For example, a system may misinterpret input data in a way that leads to incorrect conclusions or outputs. Thus, one way that hallucination can occur is when the system perceives information that is not actually present in the input data.

In order to reduce hallucination, there is a need to reduce misinterpretation of input data in order to mitigate undesired outputs in LLMs. For example, if the system hallucinates or generates incorrect information, it can lead to misinformation or errors in decision-making. In critical applications, these errors could have significant consequences. Additionally, users may lose trust in a system that produces unreliable or unexpected outputs. Trust is essential for the widespread adoption of AI technology, and hallucinations can undermine confidence in the technology.

SUMMARY

Aspects and advantages of embodiments of the present disclosure will be set forth in part in the following description, or can be learned from the description, or can be learned through practice of the embodiments.

One aspects of the present disclosure are directed to a multimodal search system. The system can receive image data from a user device. Additionally, the system can receive a prompt associated with the image data. Moreover, the system can determine, using a computer vision model, a first object in the image data that is associated with the prompt. Furthermore, the system can receive, from the user device a user indication on whether the image data includes the first object. Subsequently, in response to receiving the user indication, the system can generate a response using a large language model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 4-5 depict illustrations of example use cases of using the multimodal search system according to example embodiments of the present disclosure.

Figure 1:
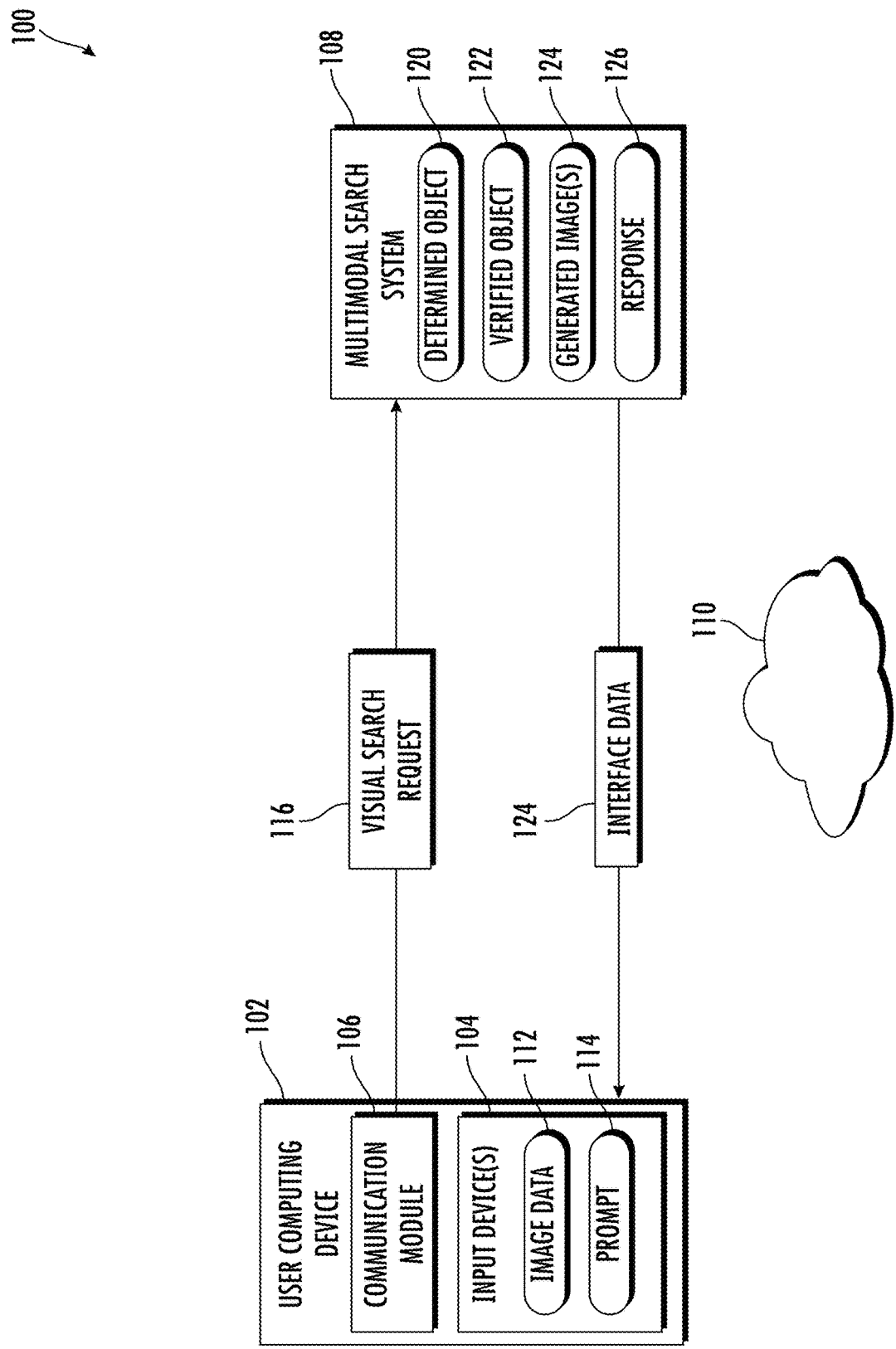
FIG. 1 depicts a block diagram of an example multimodal search system according to example embodiments of the present disclosure.

Reference numerals that are repeated across plural figures are intended to identify the same features in various implementations.

DETAILED DESCRIPTION

Today, users have many complex questions, such as how to clean a product or how to use a product. These type questions can be difficult or impossible to query in a conventional search system using just text and audio data. However, many of these complex questions can be easily expressed as multimodal queries, such as a user capturing an image of an object and asking a question about the object. By analyzing the contextual aspects of an image, the system can gain valuable insights into the intent and behavior of users in order to provide the correct answer.

Generally, the present disclosure is directed to presenting information to users retrieved in response to multimodal queries that have been user-verified. More particularly, the present disclosure relates to generating an initial response that visually identifies an object in an input image prior to generating a final response to the multimodal query. A multimodal query is a query formulated using multiple types of data (e.g., textual content, audio data, video data, image data, etc.). In response to a multimodal query, a visual search system can retrieve and/or derive information using various multimodal query processing techniques.

As an example, assume that a user provides a multimodal query consisting of a query image of an object and a corresponding prompt, such as "how do you clean this object?" A multimodal search system can determine the object in the image, prompt the user to verify the object, and generate an answer based on the verified object. However, the user may not trust the response if the user is unsure if the object in the image has been labeled correctly by the AI. In the techniques described herein, the multimodal search system can prompt the user to verify the classification of the object. As such, in response to a verification of the object in the image by the user, the multimodal search system can then process the prompt and verified object with the machine-learned large language model (LLM) to generate an output associated with the verified object. The response can include textual, audio, image, and/or video data associated with the verified object. This output can be provided to the user computing device. In such fashion, the multimodal search system can provide more accurate results based on user feedback on the visual classification of an object in the image.

In some implementations, based on a user indication that the object in the image data is correctly labeled, the multimodal visual search system can generate a response. For example, the multimodal search system can provide a response with a generated image associated with the verified object to a user device associated with the user. Based on the verification of the input data by the user, the user can presume that the response is more accurate.

Alternatively, in other implementations, based on a user indication that the object in the image data is incorrectly labeled, the multimodal search system can reclassify the object in the image data. Additionally, the multimodal search system can generate an updated response based on the reclassification of the object. Furthermore, one or more parameters of the LLM can be updated based on the user indication that the object is incorrectly labeled.

Aspects of the present disclosure provide a number of technical effects and benefits. As one example, the system and methods can improve search results by enabling multimodal searching capabilities. By obtaining user verification of the classification of the object in the received image, the system can provide more accurate search results by enhancing the query with additional signals that provide helpful context for the search. In particular, the systems and methods disclosed herein can leverage an interactive user interface that enables a user to use image data to provide better, faster, and more accurate search results.

Additionally, by enabling multimodal searching capabilities, the system increases the search space for potential search results by now being able to perform searches that may have been impossible to perform before. As the example above highlights, a user is able to perform a search that may have been previously impossible, and the system is now able to provide tutorials on how to use a product by analyzing the image data and prompt concurrently.

Moreover, the correct search results are provided faster to the user by reducing the number of interactions with the user. For example, when the user indication indicates that the object is labeled incorrectly, then the system can update the object classification prior to providing a response to the prompt, which reduces the number of responses provided to a user until the user is satisfied with the response. By concurrently analyzing the verified object with the prompt to generate the response, the search query can be more accurate than conventional systems, which typically provides a response without first verifying the object, and thus increases the likelihood of hallucinations. For example, when the user visually verifies that that the receive imaged does not include the determined object, the system can update one or more parameters of the computer vision model based on the user indication. As a result, by using reinforcement learning from human feedback (RLHF) techniques prior to generating a final response, the computer vision model can provide more accurate information, and thus reduce hallucinations. RLHF techniques including reinforcement learning from human preferences that trains a reward model directly from human feedback and uses the model as a reward function to optimize an agent's policy using reinforcement learning through an optimization algorithm (e.g., Proximal Policy Optimization). In some instances, the reward model can be trained in advance to the policy being optimized to predict if a given output is good (high reward) or bad (low reward). RLHF techniques can improve the robustness and exploration of reinforcement-learning agents, especially when the reward function is sparse or noisy.

Furthermore, based on a verified object, the system can provide direct answers (e.g., tutorials on how to use the object) to queries, which is much more desirable to users than a service that still requires the user to expend substantial time and energy conducting further research. By enabling users the ability to verify the object in the image data, the system improves the accuracy of answers. Without the ability to verify the objects in the image, many users may decline to use such search services due to a higher likelihood of obtaining an inaccurate response.

Implementations of the present disclosure allow for the user verification of AI-generated classifications of objects in an image, which results in the system quickly and efficiently providing an accurate answer to a user. In such fashion, implementations of the present disclosure can provide responses to queries while also providing the ability for a user to quickly verify the accuracy of the responses.

Another technical effect and benefit relate to improved computational efficiency and improvements in the functioning of a computing system. For example, the systems and methods disclosed herein can leverage the multimodal search system to provide a more comprehensive multimodal search query that can mitigate the use of additional searches and additional search result page browsing, which can save time, processing resources, energy, and computational power.

With reference now to the Figures, example embodiments of the present disclosure will be discussed in further detail.

FIG. 1 depicts a block diagram of an example multimodal search system 100 according to some implementations of the present disclosure. More specifically, a user computing device 102 can include input device(s) 104 and a communication module 106. The input device(s) 104 can be, or otherwise include devices that can directly or indirectly receive an input from a user (e.g., a microphone, camera, touchscreen, physical button, infrared camera, mouse, keyboard). The communication module 106 can be, or otherwise include hardware and/or software collectively configured to communicate with a visual search computing system 108 via network(s) 110. For example, the communication module 106 can include devices that facilitate a wireless connection to a network.

The user computing device 102 can obtain image data 112 and an associated prompt 114. The image data 112, such as a query image, can be an image selected to serve as a query to the multimodal search computing system 108. For example, a user of the user computing device 102 can capture the image data 112 using input device(s) 104 of the user computing device 102. Alternatively, the user may obtain the image data 112 in some other manner (e.g., performing a screen capture, downloading the image, creating the image via image creation tools).

The prompt 114 associated with the image data 112 can include textual content and/or audio provided by the user. For example, the user can directly prompt the textual content of the prompt 114 via a keyboard or some other input method included in the input device(s) 104. Alternatively, the user can indirectly provide the prompt 114. For example, the user can produce a spoken utterance, and the user computing device 102 can capture the spoken utterance with the input device(s) 104. The user computing device 102 can process the spoken utterance utilizing speech recognition techniques (e.g., a machine-learned text-to-speech model) to generate the prompt 114.

In some implementations, the image data 112 can be provided without a corresponding prompt 114, and the multimodal search system 108 can determine a likely prompt associated with the image data 112. For example, if the image data 112 depicts a bird as the main subject of interest in the image, the user computing device 102 can select a likely prompt 114 to provide alongside the image data 112 (e.g., "identify this object", "explain this", "tell me more").

Alternatively, in some implementations, the multimodal search system 108 can modify a prompt 114 provided by the user of the user computing device 102. For example, the multimodal search system 108 may modify the prompt 114 to add contextual information to the prompt (e.g., time of day, geolocation, user information, information descriptive of prior query images and/or prompts provided by the user).

The user computing device 102 can provide a visual search request 116 to the visual search computing system 108 via the network(s) 110. The visual search request 116 can include the image data 112 and the prompt 114. For example, the image data 112 can include an image of an object captured by a camera of the user computing device 102.

The multimodal search system 108 can process the visual search request 116 to determine a determined object 120 and generate a generated image 124 (e.g., generated images). Once the determined object 120 is verified by a user, the object can be labeled as a verified object 122. The generated image(s) 124 can be generated based on the determined object 120 and/or verified object 122. The response 126 generated by the multimodal search system 108 can be responsive to the prompt 114 and the image data 112. The response 126 can include generated images 124, textual content, audio content, and/or video content. For example, if the image data 112 depicts a product, and the prompt 114 is "how to clean this," the response 126 can provide an answer to the prompt (e.g., instructions on how to clean the product) associated with the verified object 122. The generated image(s) 126 can be images that are visually similar to the verified object 122. In some implementations, the multimodal search system 108 may perform various processing techniques to identify and classify the determined object 120 in the image data 112. Once the determined object 120 is verified by a user (e.g., user confirmation, user indication that the determined object 120 is in the image data 112), then the object can be labeled as a verified object 122.

In some instances, the multimodal search system 108 can generate image(s) 124 using the determined object 120 and/or verified object 122. For example, the multimodal search system 108 can include a machine-learned model that can be used to generate the generated image(s) 124. Additionally, the multimodal search system 108 can include or otherwise access a machine-learned model, such as a large language model, to generate the response 126 to the prompt 114.

The multimodal search system 108 can provide interface data 124 to the user computing device 102 via the network(s) 110. The interface data 124 can include the textual content 120 and the result images 122. For example, the interface data 124 may include instructions to highlight the textual content 120 and to include thumbnail representations of the result images 122 so that a user of the user computing device 102 can easily verify the accuracy of the result images 122, and correspondingly, the accuracy of the textual content 120. In such fashion, the visual search computing system 108 can provide responses to queries while facilitating quick and accurate verification of the answer by users.

Figure 2:
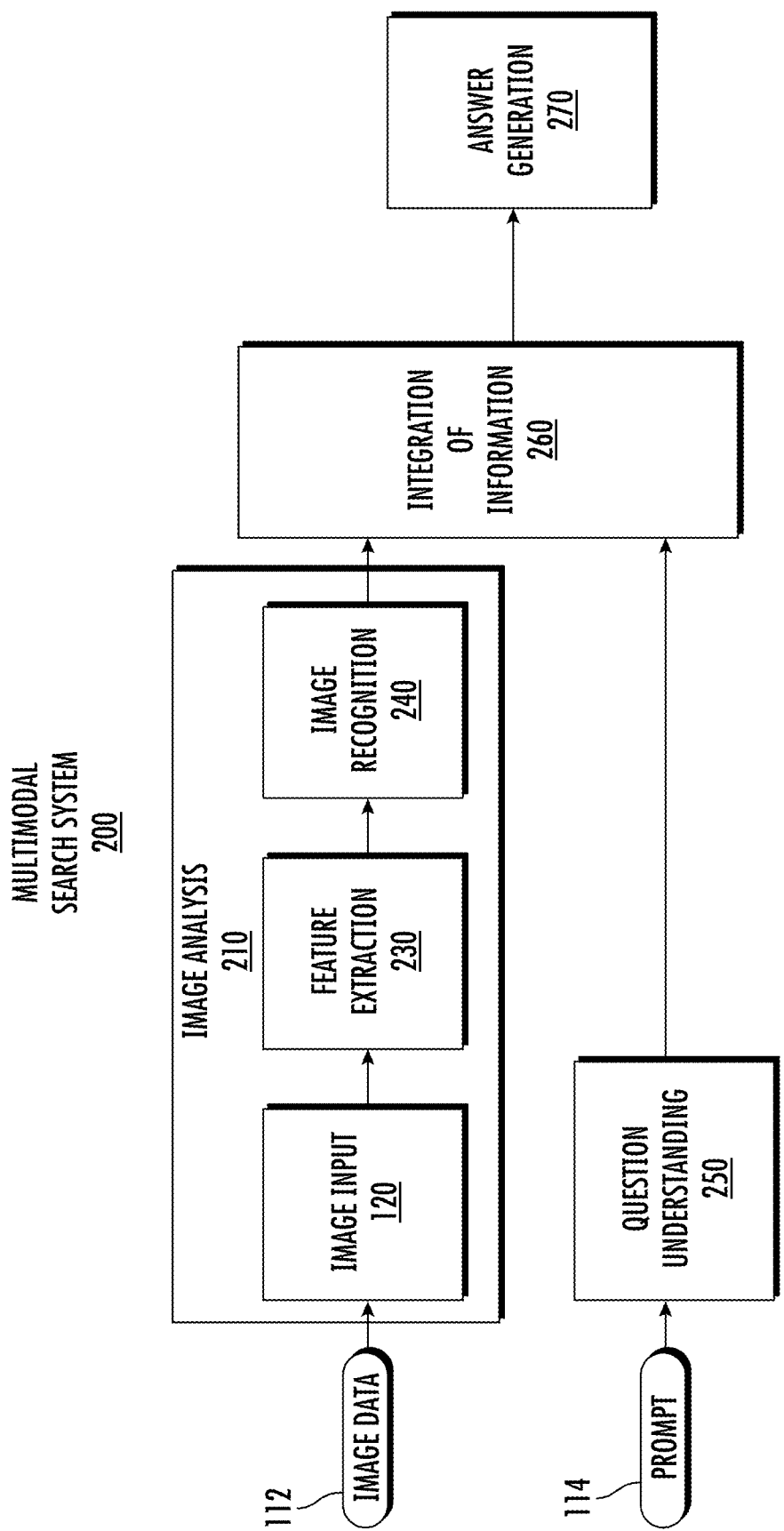
FIG. 2 depicts a block diagram of an example of a multimodal search system without an image verification according to example embodiments of the present disclosure.

FIG. 2 depicts a flow diagram of a multimodal search system 200 without an image verification according to example embodiments of the present disclosure. The multimodal search system 200 can be an example of the multimodal search system 108 in FIG. 1. The multimodal search system 200 can receive image data 112, respond to the prompt 114 by first analyzing and understanding the content of the image data 112, and then generating a response based on that understanding.

In conventional techniques, the multimodal search system 200 can perform an image analysis operation 210. In some instances, the image analysis operation 210 can include an input image operation 220, a feature extraction operation 230, and/or an image recognition operation 240. During the image input operation 220, the multimodal search system 200 can receive image data 112 as input. For example, the image data 112, as described in FIG. 1, can be a photograph, a frame from a video, or any other visual data. During the feature extraction operation 230, the multimodal search system 200 can extract relevant features from the image. The feature extraction operation 230 can involve identifying patterns, shapes, textures, and other visual elements that are key for understanding the content. During the image recognition operation 240, the multimodal search system 200 can perform image recognition to identify objects, scenes, or patterns in the image. The image recognition operation 240 can involve the use of convolutional neural networks (CNNs) or other deep learning architectures designed for image processing.

Additionally, the multimodal search system 200 can receive a prompt 114 as another input of the multimodal query. During the question understanding operation 250, the multimodal search system 200 can, simultaneously or subsequently to the image analysis operation 210, process the prompt 114 associated with the image data 112. The question understanding operation 250 can involve natural language processing (NLP) techniques to understand the meaning and context of the prompt 114. The prompt 114, as described in FIG. 1, can include audio data and/or text data.

Moreover, during the integration operation 260, the multimodal search system 200 can integrate information that is generated from both the image analysis operation 210 and the question understanding operation 250. The integration operation 260 enables the multimodal search system 200 to integrate information derived from the image data 112 and the prompt 114.

Subsequent to the integration operation 260, the multimodal search system 200 can perform an answer generation operation 270. Based on its understanding of the image data 112 and the prompt 114, the multimodal search system 200 generates a response (e.g., textual response with generated images). The response can involve generating a textual and/or audio response with corresponding generated images. Furthermore, the generated answer can then be provided as the response of the multimodal search system 200 to the prompt 114.

Figure 3:
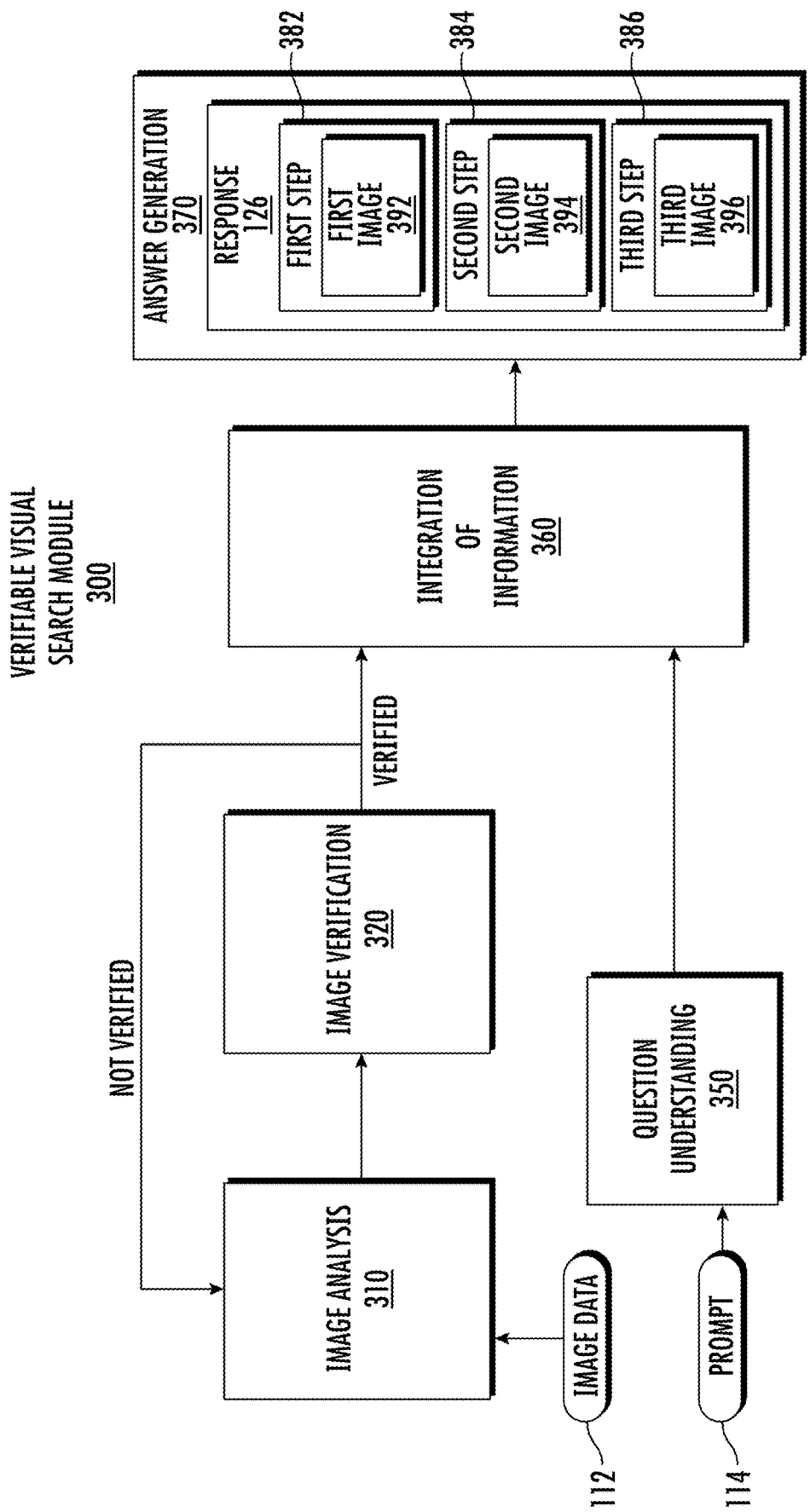
FIG. 3 depicts a flow diagram of a multimodal search system with an image verification according to example embodiments of the present disclosure.

FIG. 3 depicts a flow diagram of a multimodal search system 300 with an image verification according to example embodiments of the present disclosure. The multimodal search system 300 can be an example of the multimodal search system 108 in FIG. 1. The multimodal search system 300 can receive image data 112, respond to the prompt 114 by first analyzing and understanding the content of the image data 112, verifying the content of the image data 112 with the user, and then generating a response based on that understanding and verification.

With the addition of the verification process, the multimodal search system 300 can perform an image analysis operation 310, and then an image verification operation 320. During the image verification operation 320, the system 300 can present a determined image to the user to verify. Once the determined image is verified by the user, the system 300 can perform the integration of information operation 360. Alternatively, if the determined image is not verified by the user, then the system 300 can perform the image analysis operation 310 again based on the updated information (e.g., the determined image is not verified by the user).

As previously mentioned in FIG. 2, the image analysis operation 310 can include an input image operation (e.g., input image operation 220 in FIG. 2), a feature extraction operation (e.g., feature extraction operation 230 in FIG. 2, and/or an image recognition operation (e.g., image recognition operation 240 in FIG. 2). During the image input operation, the multimodal search system 300 can receive image data 112 as input. During the feature extraction operation, the multimodal search system 300 can extract relevant features from the image. The feature extraction operation can involve identifying patterns, shapes, textures, and other visual elements that are key for understanding the content. During the image recognition operation, the multimodal search system 300 can perform image recognition to identify objects, scenes, or patterns in the image. The image recognition operation can involve the use of convolutional neural networks (CNNs) or other deep learning architectures designed for image processing.

Additionally, the multimodal search system 300 can receive a prompt 114 as another input of the multimodal query. During the question understanding operation 350, the multimodal search system 300 can, simultaneously or subsequently to the image analysis operation 310, process the prompt 114 associated with the image data 112. The question understanding operation 250 can involve natural language processing (NLP) techniques to understand the meaning and context of the prompt 114.

Moreover, during the integration operation 360, the multimodal search system 300 can integrate information that is generated from both the image analysis operation 310 and the question understanding operation 350. Subsequent to the integration operation 360, the multimodal search system 300 can perform an answer generation operation 370. Based on its understanding of the image data 112 and the prompt 114, the multimodal search system 300 generates a response 126 (e.g., textual response with generated images). The response 126 can include instructions having a first step 382, a second step 384, a third step 386, and so on. Additionally, the response can include a first image 392 that is associated with the first step 382, a second image 394 that is associated with the second step 384, a third image 396 that is associated with the third step 386, and so on. The multimodal search system 300 can generate the first image 392, the second image 394, and the third image 396 using machine-learned image generation models.

Figure 4:
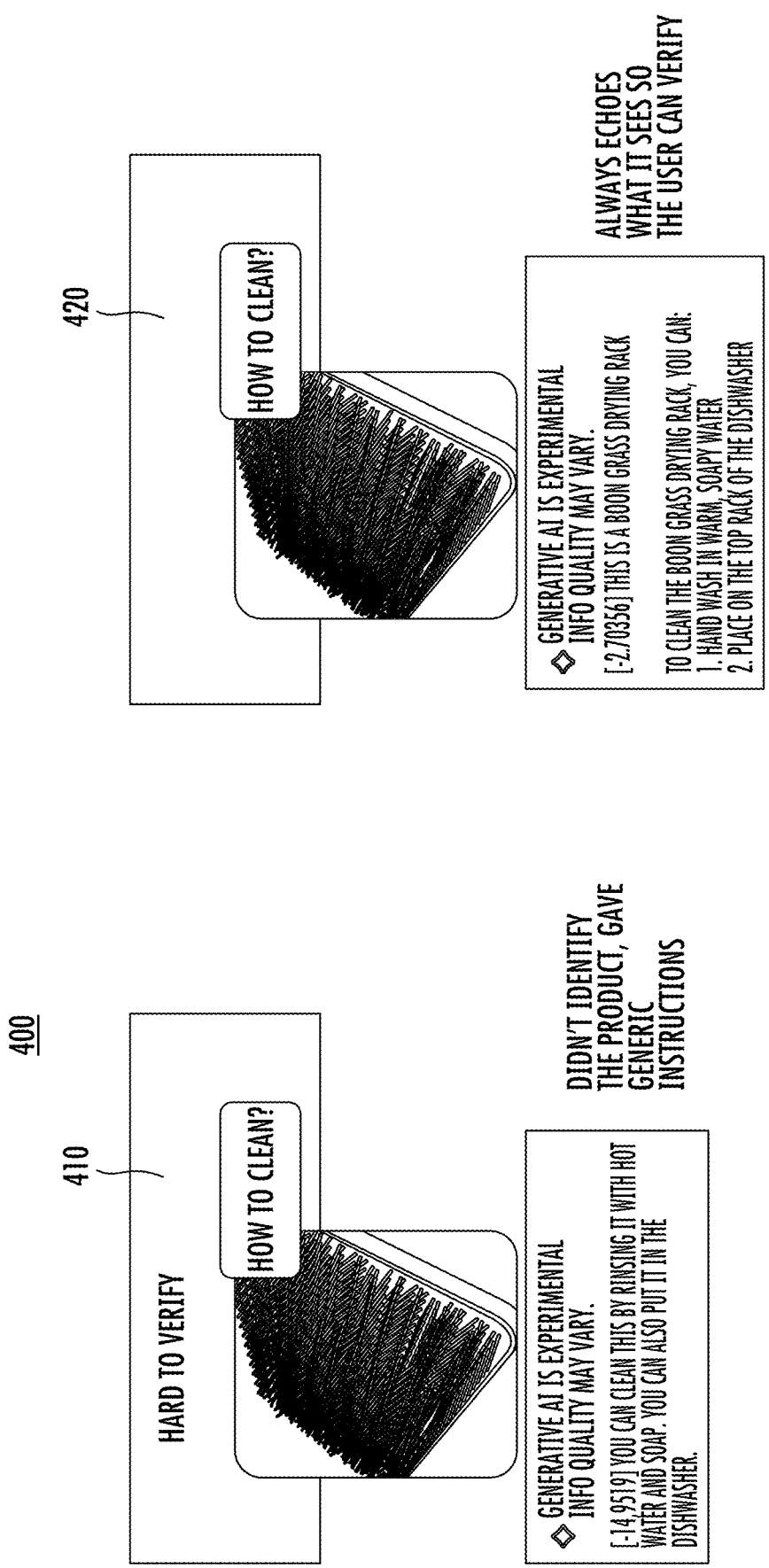
Figure 6:
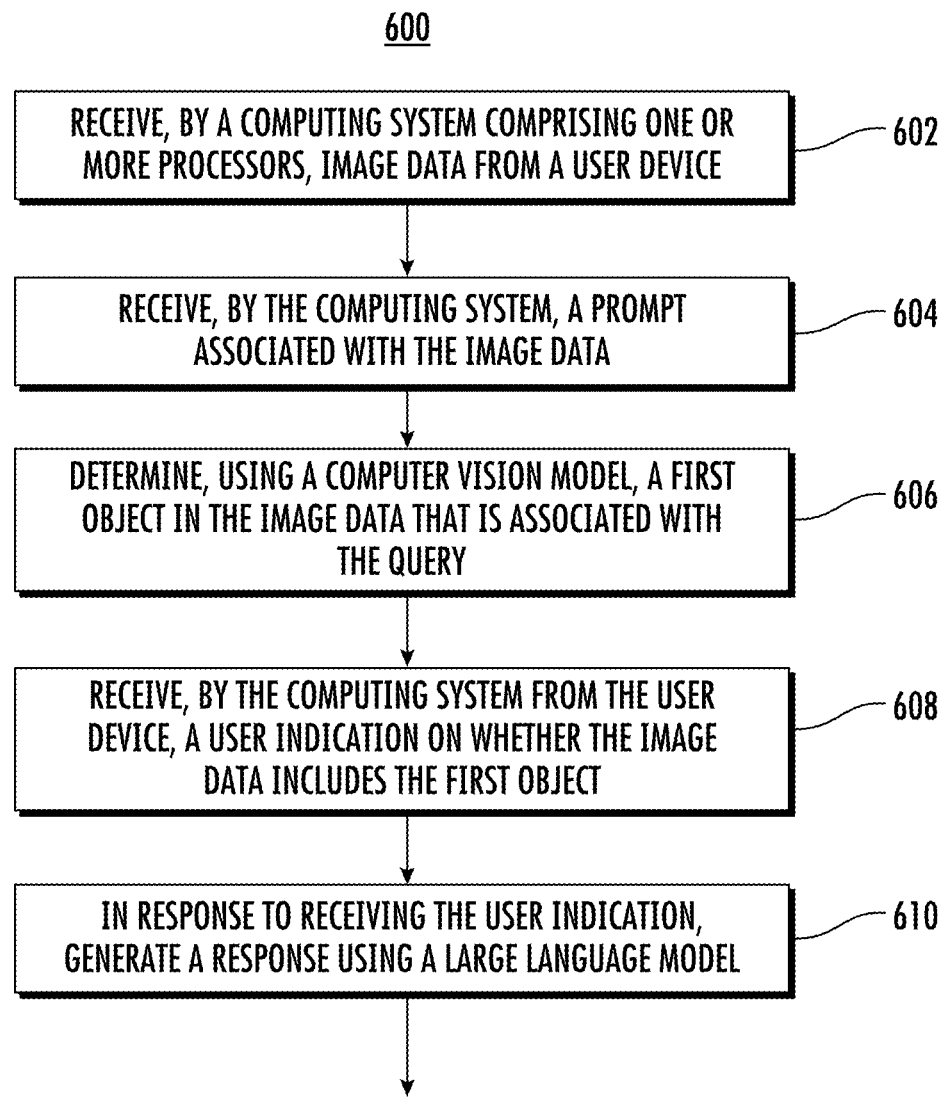
FIG. 6 depicts a flow chart diagram of an example method to perform a multimodal search with a server having a machine-learned model according to example embodiments of the present disclosure.

FIGS. 4-6 depict illustrations of example use cases of using the system according to example embodiments of the present disclosure. In some instances, a user can ask a question with a corresponding image to a system having a machine-learned model (e.g., large language model (LLM)), and the system can generate an answer. For example, in illustration 400 in FIG. 4, a user can ask a machine-learned model, such as an LLM, a question. The question can be "how to clean an object depicted in an image." The image can be received by the model from the user along with the question. In a first use case 410, the system, without identifying the object, can provide a generic response by stating "you can clean this thing by rinsing it with hot water and soap. You can also put it in the dishwasher." As a user, it may be difficult to know whether this response is correct, because the user does not know what the machine-learned model understood the object to be.

In contrast, in the second user case 420, the model enables the user to verify the object. By allowing a user to verify the object, the model can provide a more accurate response. As a result, there is a higher likelihood that the user will trust the response. According to some embodiments, the machine-learned model is trained to provide an initial response to the user with a classification of the object in the image, and subsequent to the verification of the object by the user, then the model can provide an answer to the question.

In the second use case 420, the model can determine the object in the image and provide an initial response with a classification of the image. In this example, the model can state that "this is a grass drying rack." Subsequently, the model can provide a detailed response associated specifically with the classified object. For example, the LLM can generate the response based on data obtained from the website associated with the classified object. In this example, the response to the question can include "this is a Grass Drying Rack. To clean the Grass Drying Rack, you can: (1) Hand wash in warm, soapy water; or (2) place it on the top rack of the dishwasher." In some instances, the user can verify the initial response with the object name prior to receiving the response to the question. Given that the user is aware that the model understood what the object was, the user is more likely to trust the answer.

In another example, in illustration 500 in FIG. 5, the question asked by the user can be "how to use [the object in the image]?" Similar to the first use case 410 in FIG. 4, in this first use case 510, the model, without identifying the object, can generate a generic response on how to use the object.

In the second use case 520 in FIG. 5, the model can first respond with the name of the object, which in this example is a "baby bottle electric steam sterilizer and dryer." Additionally, once the object is visually verified by the user, the model can generate a detailed response on how to use this object. The visual verification by the user can be a user input, such as a text response or audio response.

Example Methods

FIG. 6 depicts a flow chart diagram of an example method to perform a multimodal search using a server having a machine-learned model, according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

The method 600 can be performed by a computing system such as the multimodal search system 108 in FIG. 1, the multimodal search system 200 in FIG. 2, the multimodal search system 300 in FIG. 3, server computing system 830, sensor processing system 60, or output determination system 80.

At 602, a computing system (e.g., multimodal search system 300) can receive image data from a user device.

In some instances, the image data is an image of the first object, and wherein the image is captured by a camera of the user device.

In some instances, the image data is a video frame of a video captured by the user device.

At 604, the system can receive a prompt associated with the image data.

In some instances, the prompt is audio data, and the system can process, using an automatic speech recognition technique, the audio data to generate a text query. Additionally, the generation of the response is further based on the text query.

At 606, the system can determine, using a computer vision model, a first object in the image data that is associated with the prompt (e.g., query).

In some instances, prior to receiving the user indication, the system can cause a presentation, on an interface of the user device, object data indicative of the first object. In some instances, the object data is a textual output associated with a name of the first object, and wherein the interface is a graphical user interface. In some instances, the object data is an audio output associated with a name of the first object, and wherein the interface is a speaker of the user device. In some instances, the object data is an image of the first object, and wherein the image is presented on a graphical user interface of the user device.

At 608, the system can receive, from the user device, a user indication on whether the image data includes the first object.

At 610, in response to receiving the user indication, the system can generate a response using a large language model.

In some instances, the system can process the first object and the prompt, using the large language model, to generate instructions with a plurality of operations, wherein the response includes the plurality of operations.

In some instances, the system can process the image data and the plurality of operations, using a generative model, to generate a plurality of generated images, and wherein the response includes the plurality of generated images.

In some instances, the system can cause a presentation, on an interface of the user device, the plurality of operations and the plurality of generated images. For example, a first operation in the plurality of operations can be associated with a first generated image in the plurality of generated images. Additionally, the first generated image can be generated by modifying the image data based on the first operation.

In some instances, a second operation in the plurality of operations can be associated with a second generated image in the plurality of generated images. For example, the system can process the image data and the prompt, using a generative model, to generate an animation, wherein the response includes the animation.

Figure 7:
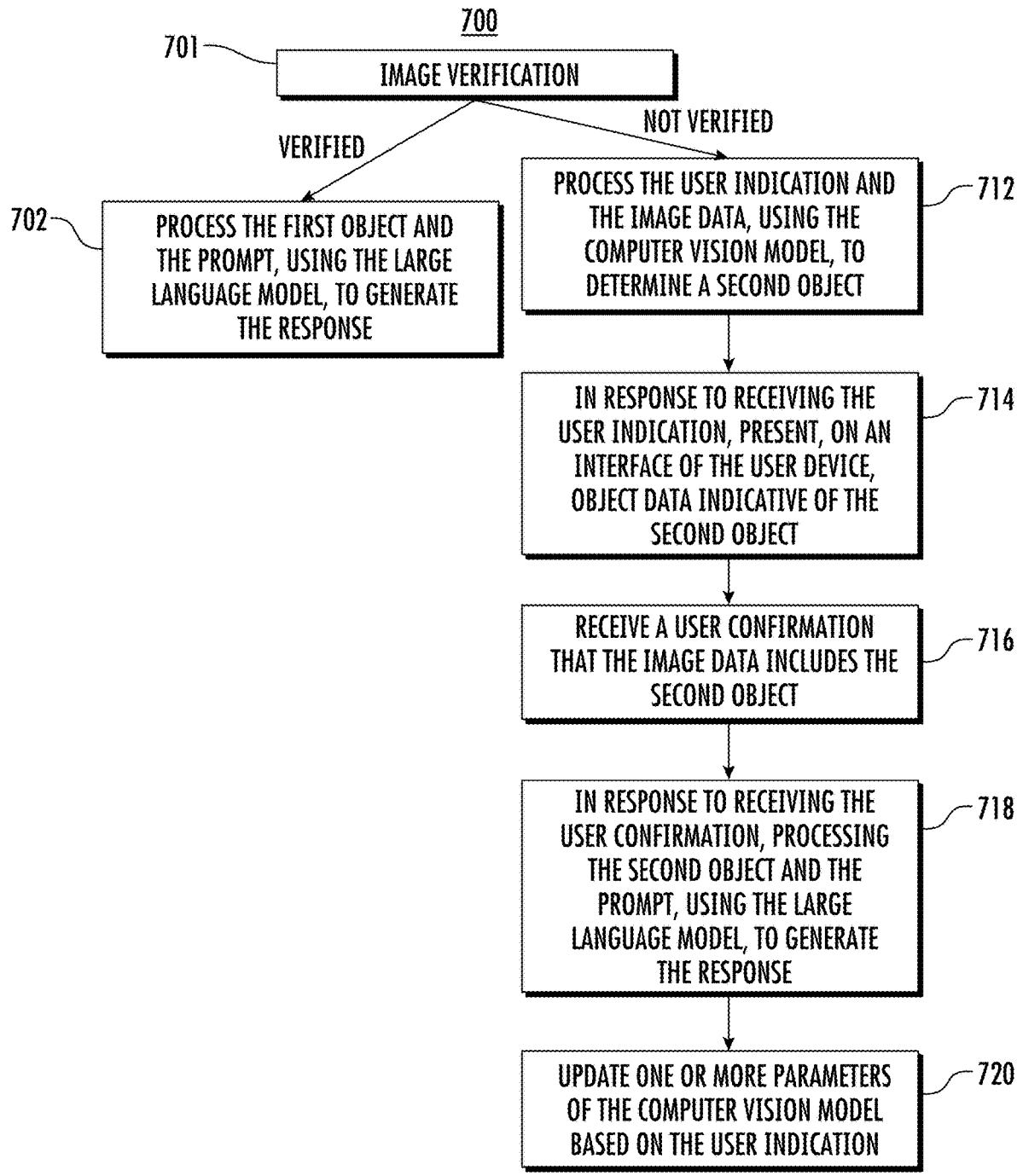
FIG. 7 depicts a flow chart diagram of an example method to perform a multimodal search with a user device having a machine-learned model according to example embodiments of the present disclosure.

FIG. 7 depicts a flow chart diagram of an example method to perform a multimodal search using a user device having a machine-learned model, according to example embodiments. Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

The method 700 can be performed by a computing system such as the multimodal search system 108 in FIG. 1, the multimodal search system 200 in FIG. 2, the multimodal search system 300 in FIG. 3, server computing system 830, sensor processing system 60, or output determination system 80.

In some instances, method 700 can be performed after receiving the user indication on whether the image data includes the first object at operation 608.

At 701, the system can perform an image verification operation. When the user verifies the object in the image, method 700 continues to operation 702. Alternatively, when the user does not verify the object in the image, method 700 continues to operation 712.

At 702, after the user indication confirms that the image data includes the first object, the system can process the first object and the prompt, using the large language model, to generate the response. In some instances, the response generated at operation 702 can be the response generated at operation 610 in method 600.

Alternatively, at 712, after the user indication rejects that the image data includes the first object, the system can process the user indication and the image data, using the computer vision model, to determine a second object.

At 714, in response to receiving the user indication, the system can present, on an interface of the user device, object data indicative of the second object.

At 716, the system can receive a user confirmation that the image data includes the second object.

At 718, in response to receiving the user confirmation, the system can process the second object and the prompt, using the large language model, to generate the response. In some instances, the response generated at operation 718 can be the response generated at operation 610 in method 600.

At 720, the system can update one or more parameters of the computer vision model based on the user indication.

Figure 8A:
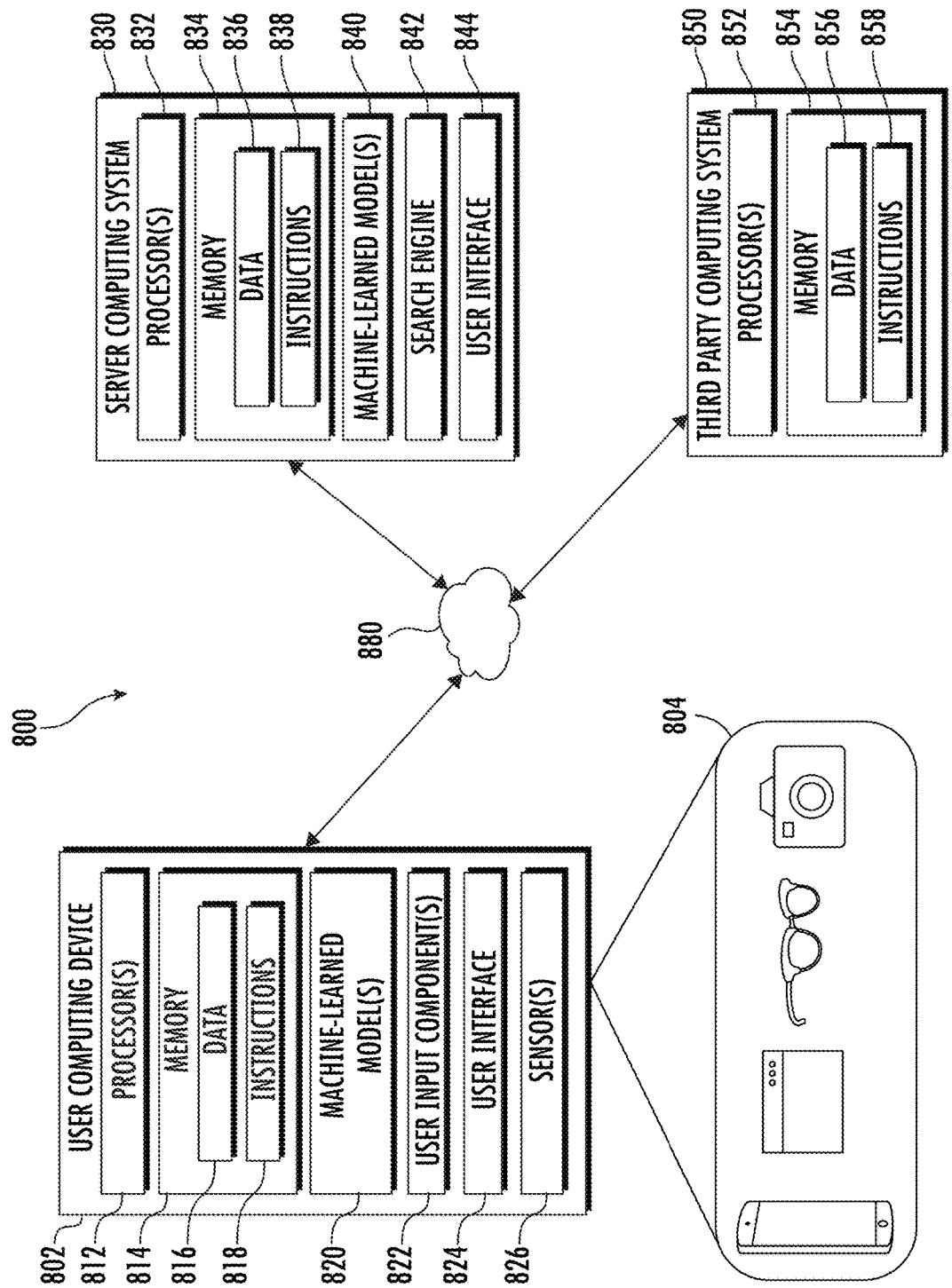
FIG. 8A depicts a block diagram of an example computing system that performs a multimodal search according to example embodiments of the present disclosure.

FIG. 8A depicts a block diagram of an example computing system 100 that performs a multimodal search according to example embodiments of the present disclosure. The system 800 includes a user computing system 802, a server computing system 830, and/or a third computing system 850 that are communicatively coupled over a network 880.

The user computing system 802 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 802 includes one or more processors 812 and a memory 814. The one or more processors 812 can be any suitable processing device (e.g., a processor core, a microprocessor, an ASIC, a FPGA, a controller, a microcontroller, etc.) and can be one processor or a plurality of processors that are operatively connected. The memory 814 can include one or more non-transitory computer-readable storage mediums, such as RAM, ROM, EEPROM, EPROM, flash memory devices, magnetic disks, etc., and combinations thereof. The memory 814 can store data 816 and instructions 818 which are executed by the processor 812 to cause the user computing system 802 to perform operations.

In some implementations, the user computing system 802 can store or include one or more machine-learned models 820. For example, the machine-learned models 820 can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. The machine-learned models 820 can be an example of the query refinement 108 in FIG. 1, the query refinement 210 in FIG. 2, and/or the machine-learned models used in methods 400, 500, and 600.

In some implementations, the one or more machine-learned models 820 can be received from the server computing system 830 over network 880, stored in the user computing device memory 814, and then used or otherwise implemented by the one or more processors 812. In some implementations, the user computing system 802 can implement multiple parallel instances of a single machine-learned model 820 (e.g., to perform parallel machine-learned model processing across multiple instances of input data and/or detected features).

More particularly, the one or more machine-learned models 820 may include one or more detection models, one or more classification models, one or more segmentation models, one or more augmentation models, one or more generative models, one or more natural language processing models, one or more optical character recognition models, and/or one or more other machine-learned models. The one or more machine-learned models 820 can include one or more transformer models. The one or more machine-learned models 820 may include one or more neural radiance field models, one or more diffusion models, and/or one or more autoregressive language models.

The one or more machine-learned models 820 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 820 can process image data, text data, audio data, and/or latent encoding data to generate output data that can include image data, text data, audio data, and/or latent encoding data. The one or more machine-learned models 820 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 840 can be included in or otherwise stored and implemented by the server computing system 830 that communicates with the user computing system 802 according to a client-server relationship. For example, the machine-learned models 840 can be implemented by the server computing system 840 as a portion of a web service (e.g., a viewfinder service, a visual search service, an image processing service, an ambient computing service, and/or an overlay application service). Thus, one or more models 820 can be stored and implemented at the user computing system 802 and/or one or more models 840 can be stored and implemented at the server computing system 830.

The user computing system 802 can also include one or more user input components 822 that receives user input (e.g., image data 112, prompt 114). For example, the user input component 822 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 824, which may be associated with one or more applications. The one or more user interfaces 824 can be configured to receive inputs and/or provide data for display (e.g., image data, text data, audio data, one or more user interface elements, an augmented-reality experience, a virtual reality experience, and/or other data for display. The user interface 824 may be associated with one or more other computing systems (e.g., server computing system 830 and/or third party computing system 850). The user interfaces 824 can include a viewfinder interface, a search interface, a generative model interface, a social media interface, and/or a media content gallery interface.

The user computing system 802 may include and/or receive data (e.g., image data 202, audio data 204) from one or more sensors 826. The one or more sensors 826 may be housed in a housing component that houses the one or more processors 812, the memory 814, and/or one or more hardware components, which may store, and/or cause to perform, one or more software packets. The one or more sensors 826 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 802 may include, and/or pe part of, a user computing device 804. The user computing device 804 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 804. For example, a camera of a smartphone may be utilized to capture image data descriptive of the environment, and/or an overlay application of the user computing device 804 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 830 includes one or more processors 832 and a memory 834. The one or more processors 832 can be any suitable processing device (e.g., a processor core, a microprocessor, an ASIC, a FPGA, a controller, a microcontroller, etc.) and can be one processor or a plurality of processors that are operatively connected. The memory 834 can include one or more non-transitory computer-readable storage mediums, such as RAM, ROM, EEPROM, EPROM, flash memory devices, magnetic disks, etc., and combinations thereof. The memory 834 can store data 836 and instructions 838 which are executed by the processor 832 to cause the server computing system 830 to perform operations.

In some implementations, the server computing system 830 includes or is otherwise implemented by one or more server computing devices. In instances in which the server computing system 830 includes plural server computing devices, such server computing devices can operate according to sequential computing architectures, parallel computing architectures, or some combination thereof.

As described above, the server computing system 830 can store or otherwise include one or more machine-learned models 840. For example, the models 840 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 840 are discussed with reference to FIG. 8B. The machine-learned models 840 can be an example of the query refinement 108 in FIG. 1, the query refinement 210 in FIG. 2, and/or the machine-learned models used in methods 400, 500, and 600.

Additionally and/or alternatively, the server computing system 830 can include and/or be communicatively connected with a search engine 842 that may be utilized to crawl one or more databases (and/or resources). The search engine 842 can process data from the user computing system 802, the server computing system 830, and/or the third party computing system 850 to determine one or more search results associated with the input data. The search engine 842 may perform term based search, label based search, Boolean based searches, image search, embedding based search (e.g., nearest neighbor search), multimodal search, and/or one or more other search techniques.

The server computing system 830 may store and/or provide one or more user interfaces 844 for obtaining input data and/or providing output data to one or more users. The one or more user interfaces 844 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 802 and/or the server computing system 830 can train the models 820 and/or 840 via interaction with the third party computing system 850 that is communicatively coupled over the network 880. The third party computing system 850 can be separate from the server computing system 830 or can be a portion of the server computing system 830. Alternatively and/or additionally, the third party computing system 850 may be associated with one or more web resources, one or more web platforms, one or more other users, and/or one or more contexts.

The third party computing system 850 can include one or more processors 852 and a memory 854. The one or more processors 852 can be any suitable processing device (e.g., a processor core, a microprocessor, an ASIC, a FPGA, a controller, a microcontroller, etc.) and can be one processor or a plurality of processors that are operatively connected. The memory 854 can include one or more non-transitory computer-readable storage mediums, such as RAM, ROM, EEPROM, EPROM, flash memory devices, magnetic disks, etc., and combinations thereof. The memory 854 can store data 856 and instructions 858 which are executed by the processor 852 to cause the third party computing system 850 to perform operations. In some implementations, the third party computing system 850 includes or is otherwise implemented by one or more server computing devices.

The network 880 can be any type of communications network, such as a local area network (e.g., intranet), wide area network (e.g., Internet), or some combination thereof and can include any number of wired or wireless links. In general, communication over the network 880 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data (e.g., image data 202). The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., audio data 204). The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data (e.g., image data 202, audio data 204). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data (e.g., image data 202) and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 802 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 800.

The central intelligence layer can communicate with a central device data layer. The central device data layer can be a centralized repository of data for the computing system 800. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 8B:
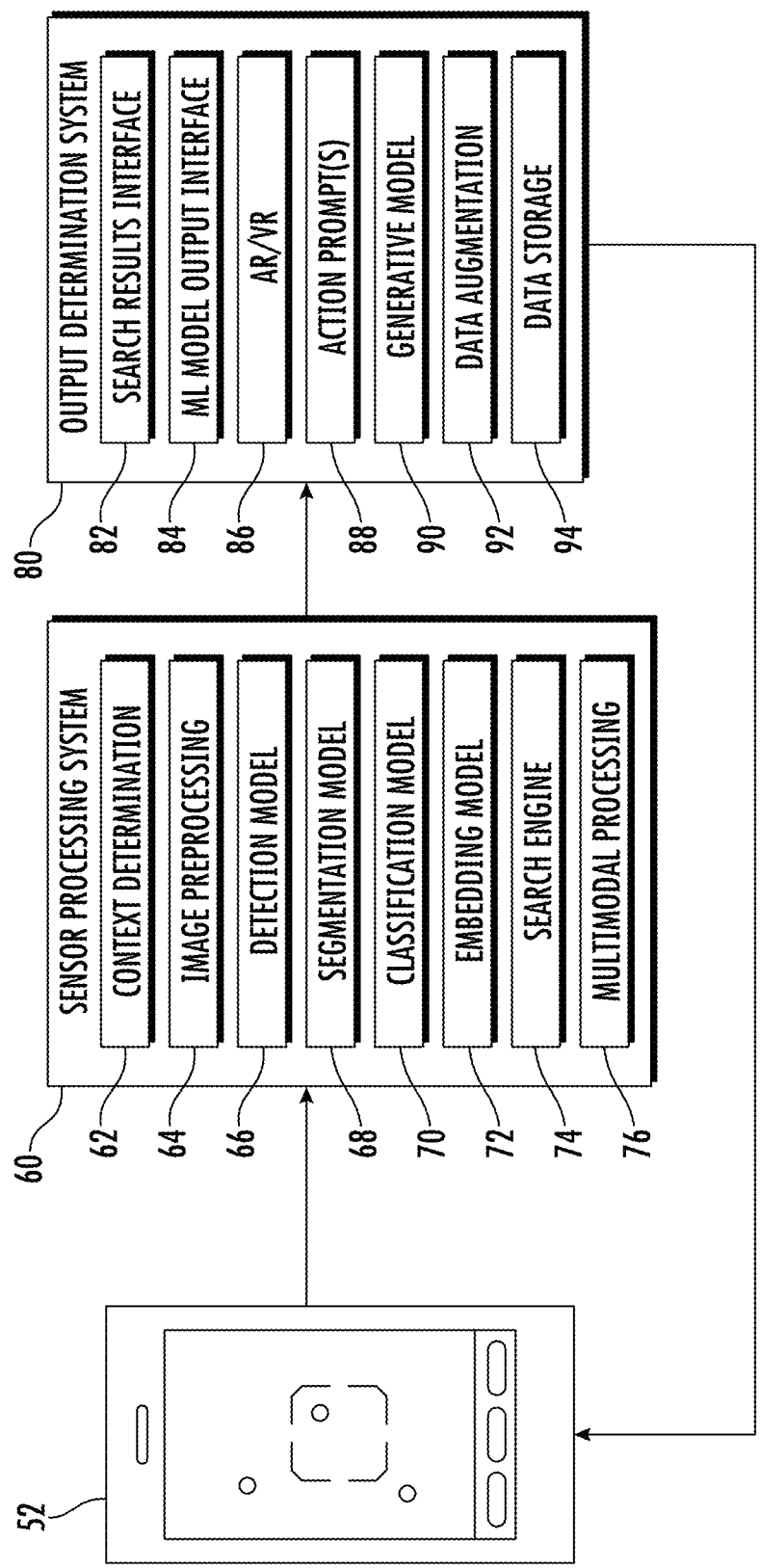
FIG. 8B depicts a block diagram of an example computing system that performs a multimodal search according to example embodiments of the present disclosure.

FIG. 8B depicts a block diagram of an example computing system 50 that performs a multimodal search according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52).

Additionally and/or alternatively, the one or more datasets can be stored data and/or retrieved data (e.g., data retrieved from a web resource). For example, images, text, and/or other content items may be interacted with by a user. The interaction with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings (e.g., text embeddings 112, image embeddings 114). For example, one or more images can be processed with the one or more embedding models 72 to generate one or more image embeddings (e.g., image embeddings 114) in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to provide user interface elements may condition and/or affect successive processing loops.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method, the method comprising:
   receiving, by a computing system comprising one or more processors, image data from a user device;
   receiving, by the computing system, a prompt query associated with the image data;
   determining, using a computer vision model, a first object from the image data that is associated with the prompt query;
   receiving, by the computing system from the user device, a user indication that the first object is incorrectly labeled;

reclassifying, by the computing system, the first object based on the user indication; and in response to receiving the user indication, generating a response using a large language model based on the reclassification of the first object.

2. The method of claim 1, further comprising:

prior to receiving the user indication, causing a presentation, on an interface of the user device, object data indicative of the first object.

3. The method of claim 2, wherein the object data is a textual output associated with a name of the first object, and wherein the interface is a graphical user interface.

4. The method of claim 2, wherein the object data is an audio output associated with a name of the first object, and wherein the interface is a speaker of the user device.

5. The method of claim 2, wherein the object data is an image of the first object, and wherein the image is presented on a graphical user interface of the user device.

6. The method of claim 1, wherein the user indication confirms that the image data includes the first object, the method further comprising:

processing the first object and the prompt query, using the large language model, to generate the response.

7. The method of claim 1, wherein the user indication rejects that the image data includes the first object, the method further comprising:

processing the user indication and the image data, using the computer vision model, to determine a second object;

in response to receiving the user indication, presenting, on an interface of the user device, object data indicative of the second object;

receiving a user confirmation that the image data includes the second object; and in response to receiving the user confirmation, processing the second object and the prompt query, using the large language model, to generate the response.

8. The method of claim 1, wherein the user indication rejects that the image data includes the first object, the method further comprising:

updating one or more parameters of the computer vision model based on the user indication.

9. The method of claim 1, wherein the image data is an image of the first object, and wherein the image is captured by a camera of the user device.

10. The method of claim 1, wherein the image data is a video frame of a video captured by the user device.

11. The method of claim 1, the method further comprising:

processing the first object and the prompt query, using the large language model, to generate instructions with a plurality of operations, wherein the response includes the plurality of operations.

12. The method of claim 11, the method further comprising:

processing the image data and the plurality of operations, using a generative model, to generate a plurality of generated images, and wherein the response includes the plurality of generated images.

13. The method of claim 12, the method further comprising:

causing a presentation, on an interface of the user device, the plurality of operations and the plurality of generated images.

14. The method of claim 12, wherein a first operation in the plurality of operations is associated with a first generated image in the plurality of generated images.

15. The method of claim 14, wherein the first generated image is generated by modifying the image data based on the first operation.

16. The method of claim 14, wherein a second operation in the plurality of operations is associated with a second generated image in the plurality of generated images.

17. The method of claim 1, the method further comprising:

processing the image data and the prompt query, using a generative model, to generate an animation, wherein the response includes the animation.

18. The method of claim 1, wherein the prompt query is audio data, the method further comprising:

processing, using an automatic speech recognition technique, the audio data to generate a text query; and wherein the generation of the response is further based on the text query.

19. A computing system, the system comprising:

one or more processors; and one or more non-transitory computer-readable media that collectively store instructions that, when executed by the one or more processors, cause the computing system to perform operations, the operations comprising:

receiving image data from a user device;

receiving a prompt query associated with the image data;

determining, using a computer vision model, a first object from the image data that is associated with the prompt query;

receiving, from the user device, a user indication that the first object is incorrectly labeled;

reclassifying, by the computing system, the first object based on the user indication; and in response to receiving the user indication, generating a response using a large language model based on the reclassification of the first object.

20. One or more non-transitory computer-readable media that collectively store instructions that, when executed by one or more computing devices, cause the one or more computing devices to perform operations, the operations comprising:

receiving image data from a user device;

receiving a prompt query associated with the image data;

determining, using a computer vision model, a first object from the image data that is associated with the prompt query;

receiving, from the user device, a user indication that the first object is incorrectly labeled;

reclassifying, by a computing system, the first object based on the user indication; and in response to receiving the user indication, generating a response using a large language model based on the reclassification of the first object.

* * * * *